United States Patent [19]

Eckard et al.

[11] 4,308,182

[45] Dec. 29, 1981

[54] DRY WIRE DRAWING LUBRICANTS BASED ON POLY (3,5-DITHIO-1,2,4-THIADIAZOLE) AND POLY (2,5-DITHIO-1,3,4-THIADIAZOLE)

[75] Inventors: Alan D. Eckard, Cortland, N.Y.; James P. King, Upper Gwynedd, Pa.

[73] Assignee: Pennwalt Corporation, Philadelphia, Pa.

[21] Appl. No.: 155,682

[22] Filed: Jun. 2, 1980

Related U.S. Application Data

[63] Continuation-in-part of Ser. No. 913,177, Jun. 6, 1978, abandoned.

[51] Int. Cl.³ .............. B21B 45/02; C08G 75/32; C10M 1/10; C10M 3/02
[52] U.S. Cl. .................................... 260/18 R; 72/42; 252/18; 252/24; 252/25; 252/31; 252/47
[58] Field of Search .................. 260/18 R; 72/42; 252/18, 24, 25, 31, 47

[56] References Cited

U.S. PATENT DOCUMENTS

| | | | |
|---|---|---|---|
| 2,349,708 | 5/1944 | Elder | 205/21 |
| 2,736,700 | 2/1956 | Graham et al. | 252/25 |
| 2,842,837 | 7/1958 | Huet et al. | 29/193 |
| 3,344,065 | 9/1967 | Gänsheimer et al. | 252/18 |
| 3,663,561 | 5/1972 | Blaha | 260/302 |
| 3,944,491 | 3/1976 | Baldwin | 72/42 |
| 3,962,103 | 6/1976 | Johnston et al. | 252/25 |
| 4,104,179 | 8/1978 | Colclough | 252/32.7 |
| 4,107,059 | 8/1978 | King et al. | 252/28 |

FOREIGN PATENT DOCUMENTS 210310  11/1966  U.S.S.R. .............. 252/31

Primary Examiner—Ronald W. Griffin

[57] ABSTRACT

Dry powdered wire drawing lubricant compositions are disclosed for the most severe drafting conditions in which mixtures of polymers of Poly (3,5-dithio-1,2,4-thiadiazole) and Poly (2,5-dithio-1,3,4-thiadiazole) act synergistically with molybdenum disulfide as extreme pressure additives. The polymers of Poly(3,5-dithio-1,2,4-thiadiazole) and Poly(2,5-dithio-1,3,4-thiadiazole) can also be used as the sole extreme pressure additive in the wire drawing lubricants.

17 Claims, No Drawings

DRY WIRE DRAWING LUBRICANTS BASED ON POLY (3,5-DITHIO-1,2,4-THIADIAZOLE) AND POLY (2,5-DITHIO-1,3,4-THIADIAZOLE)

This applicating containing new subject matter is a continuation-in-part application with respect to U.S. Ser. No. 913,177, filed June 6, 1978, now abandoned.

BACKGROUND OF THE INVENTION

Heavy drafting and the high speeds obtained in present dry wire drawing machines require drawing lubricants which can withstand both high temperatures and high pressure at the dies. The most satisfactory type of wire drawing lubricant to meet these demanding conditions are dry powdered lubricants based on soap powders, lime, sulfur and molybdenum disulfide. Molybdenum disulfide is in the nature of an extreme pressure additive and permits high speed heavy drafting of wire which up to now has not been obtainable by any other lubricant.

Molybdenum disulfide occurs in nature as molybdenite and the current supply is unable to meet the demands for the material. This shortage of molybdenum disulfide has led to a search for substitute lubricating materials which can be used in combination with molybdenum disulfide or as a replacement for it.

SUMMARY OF THE INVENTION

We have now discovered that polymers of Poly(3,5-dithio-1,2,4-thidiazole) and Poly(2,5-dithio-1,3,4-thiadiazole) act synergistically with molybdenum disulfide as extreme pressure additives in dry wire drawing compositions. The monomers of these polymers have heretofore been used as corrosion inhibitors in lubricants as disclosed in U.S. Pat. No. 3,904,537 and 3,821,236. These new wire drawing compositions are based principally on fatty acid compounds, lime, sulfur, molybdenum disulfide and polymers of Poly(3,5-dithio-1,2,4-thiadiazole) and Poly(2,5-dithio-1,3,4-thiadiazole). Other conventional wire drawing additives may be used in combination with the above to vary the lubricant properties to a small degree. In another aspect of our invention, we have found that the polymers of Poly(3,5-dithio-1,3,4-thiadiazole) and Poly(2,5-dithio-1,3,4-thiadiazole) can be used as a complete replacement for molybdenum disulfide in powdered wire drawing lubricants which eliminates the difficulty to remove residual molybdenum disulfide film.

Polymers of Poly(3,5-dithio-1,2,4-thiadiazole) and Poly(2,5-dithio-1,3,4-thiadiazole) can be used either separately or in admixture along with molybdenum disulfide as the extreme pressure additives in our wire drawing compositions.

DETAILED DESCRIPTION OF THE INVENTION

Successful wire drawing operations depend on the application of an effective lubricant to insure rapid, efficient and heavy drafting of the wire while minimizing wear on the dies. Most drawing lubricants, particularly those used in more demanding operations such as drawing stainless steel wire or rod contain one or more extreme pressure additives such as sulfur or molybdenum disulfide. Lead and antimony extreme pressure additives present potential hazards to health and the environment because of their toxicity.

The molybdenum disulfide additive is efficient in many drawing applications and is used extensively in the industry. However, use of this additive usually results in the formation of undesirable residual film on the wire which is difficult to remove by subsequent treating baths such as by acid pickling or alkaline cleaning. In addition, the demand for molybdenum disulfide is greater than the present supply and the material is on allocation to customers.

We have now discovered that a synergistic mixture of 1 to 99% by weight of polymers of Poly(3,5-dithio-1,2,4-thiadiazole) and Poly(2,5-dithio-1,3,4-thiadiazole) and 99 to 1% by weight of molybdenum disulfide produces an extreme pressure additive for wire drawing lubricants more efficiently than either the thiadiazole polymers or molybdenum disulfide used by itself. These synergistic mixtures are used in dry powdered fatty acid-lime-sulfur compositions and other types of wire drawing lubricants at a concentration of 0.1 to 25% by weight of the wire drawing composition. Preferably, the synergistic mixture will be present at a concentration of 2 to 10% by weight. If the polymers of thiadiazole are used without the molybdenum disulfide, the concentration will range from about 1 to 30% by weight. If desired, the polymers of Poly(3,5-dithio-1,2,4-thiadiazole) and Poly(2,5-dithio-1,3,4-thiadiazole) may be used as the sole extreme pressure additive in our novel wire drawing compositions.

The thiadiazole polymer-molybdenum disulfide extreme pressure additive in our wire drawing compositions enable the heavy drafting of wire under the demanding conditions such as in the drawing of stainless steel wire where the conventional extreme pressure additives are not sufficiently effective. We have also found that the replacement of the major amount or even the complete replacement of molybdenum disulfide with polymers of Poly(3,5-dithio-1,2,4-thiadiazole) and Poly(2,5-dithio-1,3,4-thiadiazole) leaves a residual film on the drawn wire which can be removed by normal alkaline cleaning procedures for wire.

Fatty acid compounds form the major vehicle for our wire drawing lubricant compositions. The term "fatty acid compound" as used in the specification and claims is intended to include fats, fatty acids, fatty acid soaps and other fatty acid derivatives. Examples of useful fats are the tallow and lard oil products which are available commercially. The fatty acid compounds useful in our wire drawing compositions are the $C_8$ to $C_{30}$ fatty acids and their glycerides and hydrogenated derivatives. The fatty acid compounds are preferably saturated and straight chain since they are commerically available but they can be unsaturated, branched chain or substituted.

The fatty acids compounds are used in our composition within the range of 10 to 85% by weight. Preferably, the fatty acid content will be within the range of 20 to 50% by weight. The fatty acids are used to form soaps under the wire drawing conditions. Fully formed soaps can also be used in our compositions and are preferred. The water soluble soaps are usually the sodium or potassium soaps of the fatty acids and/or the fatty acid derivatives. The calcium salts of the fatty acids or of the glycerides or hydrogenated fatty acids are used when water insoluble soaps are required.

Examples of fatty acid compounds useful in our lubricant compositions are tallow fatty acid, stearic fatty acid, stearin pitch fatty acid, oleic acid, tall oil fatty acid, vegetable fatty acid, white grease, lard fatty acid, stearing pitch, calcium stearate, aluminum stearate; the glycerides of tallow fatty acid, stearin pitch, stearin pitch fatty acid, oleic acid, tall oil fatty acid and vegetable fatty acids. These fatty acid compounds are commercially available. A single fatty acid compound or a mixture of them may be used in our lubricant compositions. Glycerin can be added and the glycerine content will range from 0 to 10% by weight, preferably within the range of 2 to 8%.

Another useful ingredient in our wire drawing compositions is sulfur. Sulfur is used at a concentration range of 1 to 10%, by weight. Any form of commercial grade sulfur is useful in our compositions. A preferred range of sulfur concentration is 2 to 6% by weight. It is believed that the sulfur at the high drawing temperatures reacts with the iron on the surface of the wire and forms a surface coating of iron sulfide which assists in preventing welding of the wire to the tungsten carbide dies.

Calcium hydroxide or lime is often used in our wire drawing compositions. Lime is not used when a completely water soluble film is required. The lime content governs the thickness of the lubricant film as it leaves the die. Lime will be used in our wire drawing lubricants within the range of 0 to 85% by weight. The thickest soap film is usually produced with lubricants having a lime content of 70 to 85% by weight. A preferred lime content will range from about 15 to 80% by weight. For each type of wire, wire size, reduction in wire cross-sectional area and drawing speed there is an optimum lime content which is correct for that particular operation.

In addition to controlling lubricant film thickness the lime also reacts with the fatty acids or fats to form calcium fatty acid soaps. The term "fatty acid soap forming reactant" is used in the specification and claims to define the members of the group consisting of lime, calcium carbonate, sodium carbonate, sodium hydroxide, potassium carbonate and potassium hydroxide used either singly or in combination.

The fatty acid soap forming reactants are used at a concentration ranging from 0 to above 85%. Preferably, the fatty acid soap forming reactants will be used at a concentration ranging from about 15 to 80% by weight. The sodium and potassium salts are used as the fatty acid soap forming reactant when a completely water soluble film is desired. At least 10% by weight of sodium or potassium fatty acid reactants are used in our compositions when a lubricant film which is partially water soluble is desired. When a completely water soluble film is required, the fatty acid soap forming reactants will generally be all sodium or potassium hydroxides and carbonates. The sodium and potassium hydroxides and carbonates will be present at a concentration ranging from about 0 to 85% by weight.

Lime and the other fatty acid soap forming reactants disclosed above can also act as fillers, thickeners and viscosity modifiers, along with such materials as talc, bentonite, dolomite, clay, mica, calcium sulfate, calcium oxide, sodium tetraborate, boric acid, silicates, wax, mineral pigments, zinc carbonate, zinc oxide, aluminum carbonate and aluminum oxide, used either singly or in combination. The lime may be used as the sole filler or or fatty acid soap producer or it can be used in combination with the other soap producers and/or together with fillers, thickeners and viscosity modifiers. The fillers, thickeners and viscosity modifiers will be present in our compositions within the range of 0 to about 85% by weight.

The polymers of Poly(3,5-dithio-1,2,4-thiadiazole) and their preparation are described in U.S. Pat. No. 4,107,059, which is incorporated herein by reference. The preparation of the polymers of Poly(2,5-dithio-1,3,4-thiadiazole) is also disclosed in U.S. Pat. No. 4,107,059 and in Minoura et al (Chemical Abstracts, Vol. 68, 96241 g, 1968).

The thiadiazole polymers used in our wire drawing lubricants have the following structure:

Poly(3,5-dithio-1,2,4-thiadiazole)

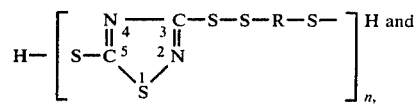

Poly(2,5-dithio-1,3,4-thiadiazole)

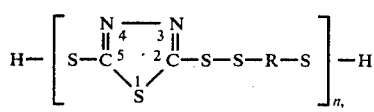

wherein: R is selected from the group consisting of

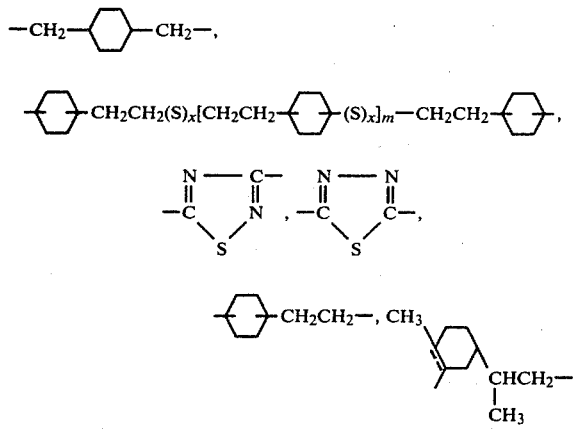

phenylene, biphenylene, and alkylene or substituted alkylene of 2–50 carbons, preferably 2–10 carbons, cyclic alkylene or substituted cyclic alkylene of 5–50 carbons, preferably 6–10 carbons, wherein the alkylene or cyclic alkylene can contain in the chain or ring oxygen and/or sulfur atoms, or $(S)_x$-groups;

m is an integer of 0–10, preferably 1–5;
n is an integer of 5–100, preferably 10–40; and
x is an integer of 1–5, preferably 1–2.

For convenience of reference, the above polymers will be referred to in the specification as the thiadiazole polymers of the invention.

The preferred polymers of thiadiazole for use in our lubricant compositions are those based on Poly(3,5-,dithio-1,2,4-thiadiazole) which appear to have a higher thermal stability. Mixtures of the Poly(3,5-dithio-1,2,4-thiadiazole) and Poly(2,5-dithio-1,3,4-thiadiazole) are also useful.

The cosynergist in admixture with the thiadiazole polymers of the invention is molybdenum disulfide. This material occurs in nature as molybdenite and is the principal molybdenum mineral mined. Molybdenum disulfide is quite stable over wide temperature ranges. Its lubricating properties can be explained by its layer lattice structure in which cleavage and shear between lamina is extremely easy. The property of molybdenum disulfide to adhere to and form coatings on metals may be an advantage or disadvantage in wire drawing operations where any residual coating on the wire must be removed before the wire can be processed further. The thiadiazole polymers of the invention overcome this defect by materially reducing or completely eliminating the amount of molybdenum disulfide required in the wire drawing compositions.

The lubricity synergism in the wire drawing compounds between the thiadiazole polymers of the invention and the molybdenum disulfide occurs over the complete range of mixtures from 1% molybdenum disulfide to 99% molybdenum disulfide. In another aspect of our invention, the thiadiazole polymers of the invention may be used as the sole extreme pressure additive in the wire drawing compositions.

The synergistic mixture of the thiadiazole polymers and molybdenum disulfide is the minor portion of our wire drawing compositions and its concentration will range from about 0.1% to about 25% by weight. Preferably, the synergistic mixture will range from about 2 to 10% by weight. If the thiadiazole polymers of the invention are used as the sole extreme pressure additive, that is without molybdenum disulfide in concentration of the thiadiazole polymers in the lubricant composition will range from about 1 to about 30% by weight and preferably within the range of about 2 to 15% by weight.

The major portion of the wire drawing compositions will be one or more of the members selected from the group of fatty acid compounds, sulfur, lime and other fatty acid soap forming reactants and optionally fillers, thickeners and surface barrier materials as described above.

We have described our invention in terms of powdered dry wire drawing compositions using the synergistic extreme pressure function of the mixtures of 1 to 99% molybdenum disulfide and 99 to 1% of one or more of the members of the group consisting of polymers of Poly(3,5-dithio-1,2,4-thiadiazole) and Poly(2,5-dithio-1,3,4-thiadiazole). The mixture of molybdenum disulfide and the polymers of thiadiazole described above will also act as extreme pressure additives in wet drawing wire lubricant compositions, grease drawing wire lubricant compositions and carrier coating wire lubricant compositions.

Poly(3,5-dithio-1,2,4-thiadiazole) was prepared as shown in Table 1 of U.S. Pat. No. 4,107,059, as follows: "To a solution of 226 g (1.0 mole) of dipotassium 1,2,4-thiadiazole-3,5-dithiolate in one liter of water was added a solution of 250.8 g (1.1 moles) of ammonium persulfate in 250 ml of water at 21°–24° C. over a period of 45 minutes during which time solids formed. The mixture was stirred an additional one hour at ambient temperatures and then was filtered. After the solids were washed with 4×500 ml of water, they were transferred to a Waring Blendor and acidified with dilute hydrochloric acid to pH of 2. The mixture was filtered and after washing with 6×500 ml of water, the filter cake was dried in a vacuum desiccator over sodium hydroxide. Yield: 127 g of the desired yellow product, m.p.>300°. Calcd. for $C_2N_2S_3$: C, 16.2; N, 18.9; S, 64.8; elemental S, 0.0; Found: C, 16.3; N, 18.5; S, 63.7; elemental S, 0.03; mol. wt.>2000."

Poly(3,5-dithio-1,2,4-thiadiazole), as prepared above, is the identical Poly(3,5-dithio-1,2,4-thiadiazole) material used in Examples 1 through 19.

Poly(2,5-dithio-1,3,4-thiadiazole) was prepared as shown in Example 4 of U.S. Pat. No. 4,107,059. The product was a yellow solid having a melting point of 177°–184° C. Calcd. for $(C_2N_2S_3)$: C, 16.2 H, 0.0; N, 18.5—Found: C, 16.0; H, 0.15; and N, 19.3. This material was used in Example 4 below.

Our invention will be more fully understood by the following specific Examples in which concentrations are given in percent by weight.

EXAMPLES 1 THROUGH 4

Examples 1 through 4 represent wire drawing compositions of our invention which are chemically reacted prior to their use in wire drawing operations. A high concentration of lime is used to produce a water insoluble fatty acid soap which in turn will leave a heavy or thick water insoluble residue on the drawn wire. In Example 1, a mixture of 50 g of stearic acid and 4.5 g. of sulfur was placed in a 300-ml. Erlenmeyer flask and heated in an oil bath at 150° C. until the acid melted. A sample of 41.5 g. of calcium hydroxide was then added and the mixture was agitated with a high shear mixer until it became plastic, followed by addition of 4.0 g of the Poly(3,5-dithio-1,2,4-thiadiazole) homopolymer. (PDTD). The resulting mixture was heated at 150° C. for 30 min. and was allowed to cool at room temperature. The final product was then mechanically ground to a minus 10 to plus 100 mesh product. In Example 2, the procedure of Example 1 was followed except that 2% of the 4% by weight 1,2,4-thiadiazole homopolymer was replaced by 2% molybdenum disulfide. In Example 3, 3.7% by weight of molybdenum disulfide was used to form the synergistic extreme pressure additive by combining it with 3.7% by weight of Poly{3-[3 or 4-thiocyclohexyl)ethyldithio]-5-thio(1,2,4-thiadiazole)} (PTCEDT), a copolymer. In Exam. 4, the procedure of Example 1 was followed except that 4.0 grams of the homopolymer of Poly(2,5-dithio-1,3,4-thiadiazole) was used as the sole extreme pressure additive. The compositions are shown in Table 1.

TABLE I

Water Insoluble Chemically Reacted Wire Drawing Compositions

| | Example 1 | Example 2 | Example 3 | Example 4 |
|---|---|---|---|---|
| Stearic Acid[1] | 50.0% | 49.0% | 46.4% | 50.0% |
| Calcium Hydroxide[2] | 41.5 | 41.0 | 38.4 | 41.5 |
| Sulfur | 4.5 | 6.0 | 4.1 | 4.5 |
| Thiadiazole polymer PDTD[3] | 4.0 | 2.0 | — | — |
| Thiadiazole polymer PDCETD[4] | — | — | 3.7 | — |
| Thiadiazole polymer PDTD[5] | — | — | — | 4.0 |
| Molybdenum Disulfide | — | 2.0 | 3.7 | 0 |
| Glycerin | — | — | 3.7 | 0 |

[1]Stearic acid may be replaced by tallow fatty acid, oleic acid, vegetable fatty acids, glycerides of various fatty acids, or hydrogenated fatty acids or fatty acid residues.
[2]Some of the calcium hydroxide may be replaced by calcium oxide, talc (all types), mica (all types), clay (all types), precipitated or ground calcium carbonate, water glass, calcium sulfate, dolomite, silicates, borates, and other mineral thickeners, fillers and surface barriers.
[3]Polymer of Poly(3,5-dithio-1,2,4-thiadiazole).
[4]Copolymer Poly(3,5-dithio-1,2,4-thiadiazole) and 3- or 4-(betamercaptoethyl)cyclohexanithiol.
[5]Polymer of Poly(2,5-dithio-1,3,4-thiadiazole).

EXAMPLES 5 THROUGH 7

In Examples 5 through 7, a minimum of approximately 10% by weight of the fatty acids are reacted with sodium compounds to produce sodium soaps in addition to the calcium soaps obtained from the calcium hydroxide and fatty acid. This produces a wire drawing compound which is partially water soluble and will in turn leave residual films on the wire which are not as thick as the films obtained in Experiments 1 through 4, and which more easily removed after completion of the drafting. In Example 5 a mixture of 42.0 g of stearic acid and 4 g of sulfur was heated in an oil bath at 150° C. until melted. A mixture of 38 g of calcium hydroxide, 5 g of sodium carbonate, and 5 g of 50% sodium hydroxide solution was slowly added to the above molten mass. The resulting mixture was agitated with a high shear mixer until it became homogeneous, followed by addition of 4 g of Poly(3,5-dithio-1,2,4-thiadiazole) (PDTD). The final mixture was heated at 150° C. for an additional 30 min. before allowing to cool to room temperature. The final product was mechanically ground to a desired particle size before use. In Example 6, 2.0 grams of the homopolymer of Poly(3,5-dithio-1,2,4-thiadiazole) and 2.0 grams of molybdenum disulfide were used in place of 4.0 grams of the homopolymer of Poly(3,5-dithio-1,2,4-thiadiazole) as the extreme pressure additive. In Example 7, the extreme pressure additive was the same as in Example 6, but 4.0 grams of glycerin were added. The compositions are shown in Table II.

TABLE II

Partially Water Soluble Chemically Reacted Wire Drawing Compositions

|  | Example 5 | Example 6 | Example 7 |
|---|---|---|---|
| Stearic Acid[1] | 42.0% | 42.0% | 40.0% |
| Calcium Hydroxide[2] | 38.0 | 38.0 | 36.0 |
| Sulfur | 4.0 | 4.0 | 4.0 |
| Thiadiazole polymer PDTD[3] | 4.0 | 2.0 | 2.0 |
| Sodium Carbonate | 5.0 | 5.0 | 5.0 |
| Sodium Hydroxide, 50% | 5.0 | 5.0 | 5.0 |
| Sodium Tetraborate Pentahydrate | 2.0 | 2.0 | 2.0 |
| Molybdenum Disulfide | — | 2.0 | 2.0 |
| Glycerin | — | — | 4.0 |

[1]Stearic acid may be replaced with tallow fatty acid, oleic acid, vegetable fatty acids, glycerides of various fatty acids, hydrogenated fatty acids, or fatty acid containing residues and by-products.
[2]Some of the calcium hydroxide may be replaced with calcium oxide, talc (all types), mica (all types), clay (all types) calcium carbonate, calcium sulfate, silicate and other mineral thickeners, fillers and surface barriers.
[3]Polymer of Poly(3,5-dithio-1,2,4-thiadiazole).

EXAMPLES 8 THROUGH 10

Examples 8 through 10 were prepared in the same manner as Example 5 except that the calcium hydroxide has been completely replaced with sodium compounds. This produces a chemically reacted lubricant for wire drawing which leaves a residue which is water soluble and easily removed from the wire. In Example 8, the extreme pressure additive is the homopolymer of Poly(3,5-dithio-1,2,4-thiadiazole). In Example 9, the extreme pressure additive was a synergistic mixture of molybdenum disulfide and the homopolymer of Poly(3,5-dithio-1,2,4-thiadiazole). In Example 10, the composition of Example 9 was followed with the addition of 3% by weight of glycerine. The compositions are shown in Table III.

TABLE III

Water Soluble Chemically Reacted Wire Drawing Compositions

|  | Example 8 | Example 9 | Example 10 |
|---|---|---|---|
| Stearic Acid | 40.0% | 38.0% | 38.0% |
| Sodium Carbonate[1] | 20.0 | 20.0 | 18.0 |
| Sodium Hydroxide, 50% | 15.0 | 18.0 | 15.0 |
| Sodium Tetraborate Pentahydrate[1] | 20.0 | 18.0 | 18.0 |
| Sulfur | 2.0 | 2.0 | 4.0 |
| Thiadiazole polymer PDTD[2] | 3.0 | 2.0 | 2.0 |
| Molybdenum Disulfide | — | 2.0 | 2.0 |
| Glycerin | — | — | 3.0 |

[1]Sodium carbonate and/or sodium tetraborate may be replaced with calcium carbonate, talc, mica, clay, bentonite, dolomite, any sodium or potassium silicates, calcium sulfate, or boric acid.
[2]Homopolymer of Poly(3,5-dithio-1,2,4-thiadiazole).

Following chemical reaction of the components of the wire drawing compositions the reaction material is ground in hammer mills to produce a powder of desired size. This particle size will generally range from 100% through 10 mesh Tyler screen to 95% on 100 mesh.

EXAMPLES 11 THROUGH 13

Examples 11 through 13 represent lubricant compositions which are mechanically blended as compared to the lubricant compositions which were chemically reacted and fused prior to their application to wire drawing operations. We have observed that a more uniform composition is obtained when the components of the wire drawing compositions are chemically reacted and fused prior to their use in wire drawing.

In Example 11, a mixture of 20 g of powdered calcium stearate, 20 g of powdered aluminum stearate and 4 g of sulfur was blended at room temperature. While the mixture was agitated with a high speed mixer, another mixture comprising 20 g of calcium hydroxide, 4 g of thiadiazole polymer (PDTD), 4 g of molybdenum oxysulfide dithiocarbamate and 18.0 g of talc was added slowly. Examples 12 and 13 followed the procedure of Example II. The compositions are shown in Table IV.

TABLE IV

Mechanical Blend of Water Insoluble Wire Drawing Compositions

|  | Example 11 | Example 12 | Example 13 |
|---|---|---|---|
| Calcium Stearate[1] | 20.0% | 30.0% | 40.0% |
| Aluminum Stearate[1] | 20.0 | 10.0 | |
| Calcium Hydroxide | 20.0 | 15.0 | 10.0 |
| Calcium Carbonate | 10.0 | 15.0 | 20.0 |
| Sulfur | 4.0 | 4.0 | 4.0 |
| Thiadiazole polymer PDTD[2] | 4.0 | 2.0 | 2.0 |
| Molybdenum Disulfide | — | 2.0 | 2.0 |
| Molybdenum Oxysulfide Dithiocarbamate | 4.0 | 4.0 | — |
| Talc | 18.0 | 9.0 | 11.0 |
| Clay | | 9.0 | 11.0 |

[1]Instead of calcium stearate and/or aluminum stearate, calcium, aluminum, sodium or potassium salts of tallow fatty acid, lard fatty acid, oleic acid, vegetable fatty acids, or blends of these or other fatty acids, may be used.
[2]Polymer of Poly(3,5-dithio-1,2,4-thiadiazole).

EXAMPLE 14

In a water cooled Vaughn wire drawing machine containing 6 die stations number 430 stainless rod was drawn from a diameter of 0.220 inches to 0.045 inches in two passes through the Vaughn machine using a powdered wire drawing composition containing tallow fatty acid-25%, stearic acid-25%, glycerine-5%, lime-32.7%, sulfur-2.3%, and molybdenum disulfide-10.0%, all percentages by weight.

The die boxes were cleared of the above wire drawing lubricant and replaced with the following wire drawing composition described in Example 2 of Table I. In this chemically reacted wire drawing composition the extreme pressure additive was a synergistic mixture of 2% molybdenum disulfide and 2% homopolymer of Poly(3,5-dithio-1,2,4-thiadiazole). The wire drawing of the identical stainless wire from 0.220 inches to 0.045 inches with the synergistic extreme pressure additive was equally efficient as the prior drawing using the lubricant containing the 10% molybdenum disulfide as described above.

EXAMPLE 15

Following the procedure described in Example 14, the die boxes in the Vaughn wire drawing machine were emptied and then refilled with the chemically reacted wire drawing compositions described in Example 1 of Table I. In this composition the sole extreme pressure additive was the homopolymer of Poly(3,5-dithio-1,2,4-thiadiazole). Reduction of the 430 stainless wire from 0.220 inches to 0.045 inches was satisfactorily accomplished although die pressures were slightly higher than in Example 14.

EXAMPLE 16

Following the procedure described in Example 14, the die boxes in the Vaughn Wire Drawing Machine were emptied and then refilled with a composition consisting of: stearic acid—50.42%; sulfur—4.45%; lime—41.0%; and molybdenum disulfide—4.04%, all percentages being by weight. In drawing stainless steel wire from a diameter of about 0.22 inches to 0.045 inches, in two passes involving 11 die stations, at drawing speeds of about 700 feet per minute, poor die life was shown and the wire drawing had to be discontinued.

EXAMPLES 17, 18 and 19

The synergistic activity of Poly(3,5-dithio-1,2,4-thiadiazole) and molybdenum disulfide in a typical wire drawing lubricant was demonstrated in Shell Four Ball tests. Three different compositions were prepared from a base lubricant having the composition 52.6% weight stearic acid, 4.2% weight sulfur, and 43.2% weight lime. The base lubricant is a typical powdered wire drawing lubricant.

The compositions were as follows:

| Ingredients | Composition (% Weight) | | |
|---|---|---|---|
| | Ex. 17 | Ex. 18 | Ex. 19 |
| Stearic Acid | 50.5 | 50.5 | 50.5 |
| Sulfur | 4.0 | 4.0 | 4.0 |
| Lime | 41.5 | 41.5 | 41.5 |
| Molybdenum Disulfide | 4.0 | 2.0 | 0 |
| Poly(3,5-dithio-1,2,4-thiadiazole | 0 | 2.0 | 4 |

Ten grams of each of the compositions 17, 18 and 19 were mixed in a ball mill with 90 grams of RM81, a lithium grease containing 12 hydroxy stearate thickener.

The above lubricant compositions were then subjected to the Shell Four Ball EP Test and the following results were obtained:

| | Composition | | |
|---|---|---|---|
| | Ex. 17 | Ex. 18 | Ex. 19 |
| Weld Point (KG) Shell Four Ball | 315 | 450 | 400 |

Lubricant composition 18 which contained 0.2% molybdenum disulfide and 0.2% Poly(3,5-dithio-1,2,4-thiadiazole) had a much greater weld point (450 KG) than either of the compositions containing an equivalent amount, i.e., 0.4% molybdenum disulfide in composition 17 (Weld Point 315 KG) or composition C containing 0.4% Poly(3,5-dithio-1,2,4-thiadiazole) (400 KG Weld Point). These weld points demonstrate the synergistic effect of molybdenum disulfide and Poly(3,5-dithio-1,2,4-thiadiazole) in the wire drawing compositions. The weld point of the RM81 lithium grease by itself was 140 KG.

We claim:

1. A synergistic wire drawing composition comprising the following members expressed in percent by weight: from 10 to 85% of one or more fatty acid compounds, from 1 to 10% sulfur, from 0 to 85% of one or more fatty acid soap forming reactants selected from the group consisting of lime, calcium carbonate, sodium carbonate, sodium hydroxide, potassium carbonate and potassium hydroxide, from 0 to 85% of one or more members selected from the group consisting of fillers, thickeners and viscosity modifiers, from 0 to 10% glycerin and from 0.1 to 25% of a mixture of 1 to 99% molybdenum disulfide and 99 to 1% or one or more polymers having the structure:

POLY(3,5-DITHIO-1,2,4-THIADIAZOLE)

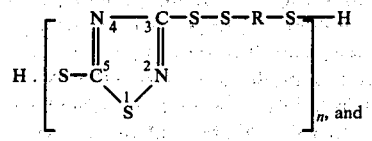

and

POLY(2,5-DITHIO-1,3,4-THIADIAZOLE)

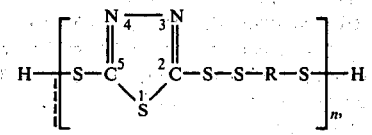

wherein: R is selected from the group consisting of

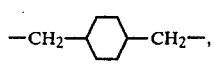

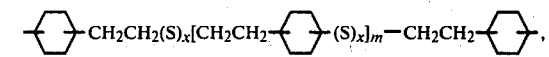

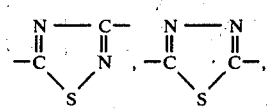

-continued

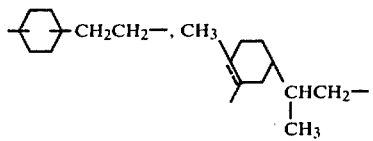

phenylene, biphenylene and alkylene of 2-50 carbons, cyclic alkylene of 5-50 carbons, wherein the alkylene or cyclic alkylene can contain in the chain or ring oxygen and/or sulfur atoms, or $(S)_x$—groups;

m is an integer of 0-10,
n is an integer of 5-100, and
x is an integer of 1-5.

2. The composition of claim 1 in which the fatty acid compound is stearic acid, the fatty acid soap forming reactant is lime and the concentration of the lime is within the range of 15 to 80% by weight.

3. The composition of claim 1 in which the glycerine content is within the range of 2 to 8%.

4. The composition of claim 1 in which the thiadiazole polymers mixed with molybdenum disulfide are Poly(3,5-dithio-1,2,4-thiadiazole).

5. The wire drawing composition of claim 1 in which the composition is heated at about 150° C. while stirring until a plastic mass is formed, thereafter the plastic mass is cooled to room temperature, and, finally, the cooled plastic mass is mechanically ground to produce a powder.

6. The wire drawing composition of claim 1 in which the fatty acid soap forming reactants are selected from the group consisting of sodium carbonate, sodium hydroxide, potassium carbonate and potassium hydroxide.

7. The composition of claim 1 in which the fatty acid compound is a member selected from the group consisting of the glycerides of tallow, stearic acid, stearin pitch acid, oleic acid, white grease, lard, calcium stearate and aluminum stearate.

8. A synergistic wire drawing composition comprising the following members expressed in percent of weight: from 20 to 50% of one or more fatty acid compounds, from 2 to 6% sulfur, from 15 to 80% of one or more fatty acid soap forming reactants selected from the group consisting of lime, calcium carbonate, sodium carbonate, sodium hydroxide, potassium carbonate and potassium hydroxide, from 0 to 85% of one or more members selected from the group consisting of fillers, thickeners and viscosity modifiers, from 2 to 8% glycerin and from 2 to 10% of a mixture of 1 to 99% molybdenum disulfide and 99 to 1% of one or more polymers having the structure:

POLY(3,5-DITHIO-1,2,4-THIADIAZOLE)

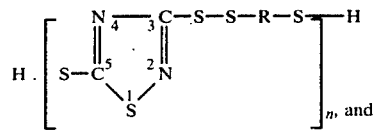 and

POLY(2,5-DITHIO-1,3,4-THIADIAZOLE)

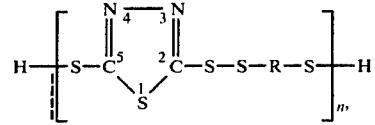

wherein: R is selected from the group consisting of

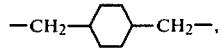

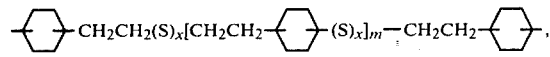

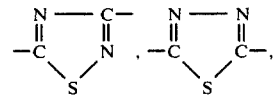

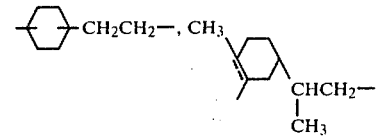

phenylene, biphenylene and alkylene of 2-50 carbons, cyclic alkylene of 5-50 carbons, where the alkylene or cyclic alkylene can contain in the chain or ring oxygen and/or sulfur atoms, or $(S)_x$-groups;

m is an integer of 0-10,
n is an integer of 5-100, and
x is an integer of 1-5.

9. The composition of claim 8 in which the fatty acid soap forming reactant is lime.

10. The composition of claim 8 in which the fatty acid compound is a mixture of stearic and tallow acids and the thiadiazole polymer is Poly(3,5-dithio-1,2,4thiadiazole).

11. The wire drawing composition of claim 8 in which the fatty acid soap forming reactants are selected from the group consisting of sodium carbonate, sodium hydroxide, potassium carbonate and potassium hydroxide.

12. The wire drawing composition of claim 8 in which the composition is heated to about 150° C. while stirring until a plastic mass is formed, thereafter the plastic mass is cooled to room temperature, and, finally, the cooled plastic mass is mechanically ground to produce a powder.

13. The composition of claim 8 in which the filler is sodium tetraborate at a concentration of about 20% by weight.

14. The composition of claim 8 in which the fatty acid compound is a member selected from the group consisting of the hydrogenates of tallow, stearic acid, stearin pitch acid, oleic acid, white grease, lard, calcium stearate and aluminum stearate.

15. A synergistic wire drawing composition comprising the following members expressed in percent of weight: from 10 to 85% of one or more fatty acid compounds, from 1 to 10% sulfur, from 15 to 80% of one or more fatty acid soap forming reactants selected from the group consisting of lime, calcium carbonate, sodium carbonate, sodium hydroxide, potassium carbonate and potassium hydroxide of which at least 10% is sodium or potassium salts; from 0 to 85% of one or more members selected from the group consisting of fillers, thickeners and viscosity modifiers, from 0 to 10% glycerin and from 0.1 to 25% of a mixture of 1 to 99% molybdenum disulfide and 99 to 1% of one or more polymers having the structure:

POLY(3,5-DITHIO-1,2,4-THIADIAZOLE)

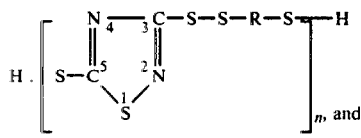

, and

POLY(2,5-DITHIO-1,3,4-THIADIAZOLE)

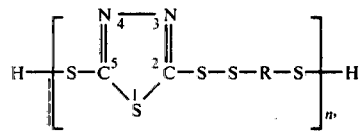

wherein: R is selected from the group consisting of

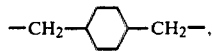

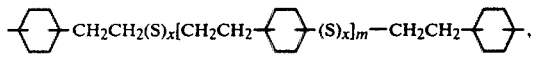

-continued

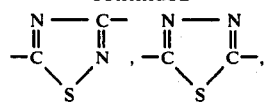

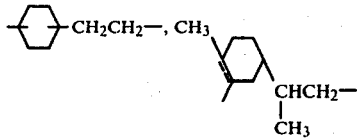

phenylene, biphenylene and alkylene of 2–50 carbons, cyclic alkylene of 5–50 carbons, wherein the alkylene or cyclic alkylene can contain in the chain or ring oxygen and/or sulfur atoms, or $(S)_x$-groups;

m is an integer of 0–10, n is an integer of 5–100, and x is an integer of 1–5.

16. The wire drawing composition of claim 15 in which the composition is heated to about 150° C. while stirring until a plastic mass is formed, thereafter the plastic mass is cooled to room temperature, and, finally, the cooled plastic mass is mechanically ground to produce a powder.

17. The composition of claim 15 in which the fatty acid compound is a member selected from the group consisting of tallow, stearic acid, stearin pitch acid, oleic acid, white grease, lard, calcium stearate and aluminum stearate.

* * * * *